(12) United States Patent
Raman

(10) Patent No.: US 9,252,980 B2
(45) Date of Patent: Feb. 2, 2016

(54) CLOUD SERVICES FOR WEARABLE AND SNAPPABLE DEVICES

(71) Applicant: Verizon Patent and Licensing Inc., Arlington, VA (US)

(72) Inventor: Madhusudan Raman, Sherborn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 25 days.

(21) Appl. No.: 14/148,279

(22) Filed: Jan. 6, 2014

(65) Prior Publication Data

US 2015/0133191 A1     May 14, 2015

Related U.S. Application Data

(60) Provisional application No. 61/902,622, filed on Nov. 11, 2013.

(51) Int. Cl.
*H04B 1/38*     (2015.01)
*H04L 12/64*     (2006.01)
*H04M 1/725*     (2006.01)

(52) U.S. Cl.
CPC ....... *H04L 12/6418* (2013.01); *H04M 1/72525* (2013.01); *H04M 2250/12* (2013.01)

(58) Field of Classification Search
CPC ... H04W 24/00; H04L 12/2602; H04L 41/06; H04L 41/0803; H04L 41/12; H04L 41/22; H04L 12/2818; H04L 12/282; H04L 2012/2841; G06F 17/30864; G06F 11/00; G06F 11/079; G06F 15/00
USPC ........................................................ 455/557
See application file for complete search history.

(56) References Cited

U.S. PATENT DOCUMENTS

2005/0086366 A1\*   4/2005   Luebke et al. ................. 709/238
2007/0232288 A1\*   10/2007   McFarland et al. ........... 455/423

OTHER PUBLICATIONS

A. Campbell, T. Choudhury "From Smart to Cognitive Phones," Pervasive Computing pp. 7-11 1536-1268/12, IEEE Computer Society, 2012.

\* cited by examiner

*Primary Examiner* — Kwasi Karikari

(57) ABSTRACT

Wearable and snappable sensing devices may act to sense data associated with an environment of the user. A mobile device and the wearable/snappable device may together operate to provide an application for sensing environmental data associated with the user, analyzing the environmental data, and providing reports to the user. In one implementation, a mobile device may connect to an external sensing device; receiving, from the sensing device, environmental data sensed by the sensing device; provide, over a wide area network, a classification query to a remote classification service, the classification query being based on the sensed data; receive, from the classification server, classification results in response to the classification query; and provide, via a graphical display of the mobile computing device, a report based on the classification results.

20 Claims, 9 Drawing Sheets

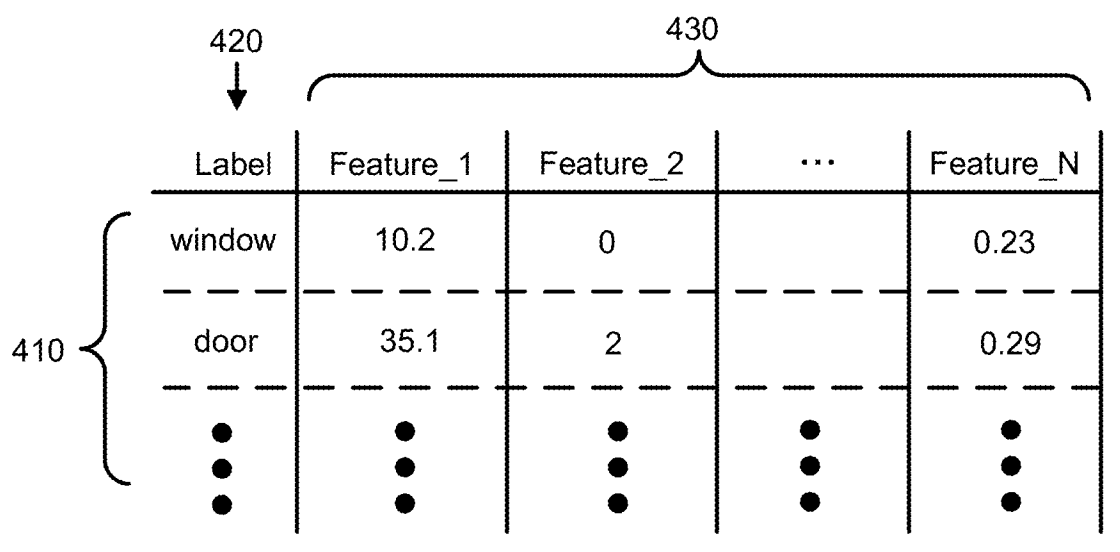

| Label | Feature_1 | Feature_2 | ... | Feature_N |
|---|---|---|---|---|
| window | 10.2 | 0 | ... | 0.23 |
| door | 35.1 | 2 | ... | 0.29 |
| ... | ... | ... | ... | ... |

420 → Label
410: {window, door, ...}
430: {Feature_1, Feature_2, ..., Feature_N}

Fig. 4

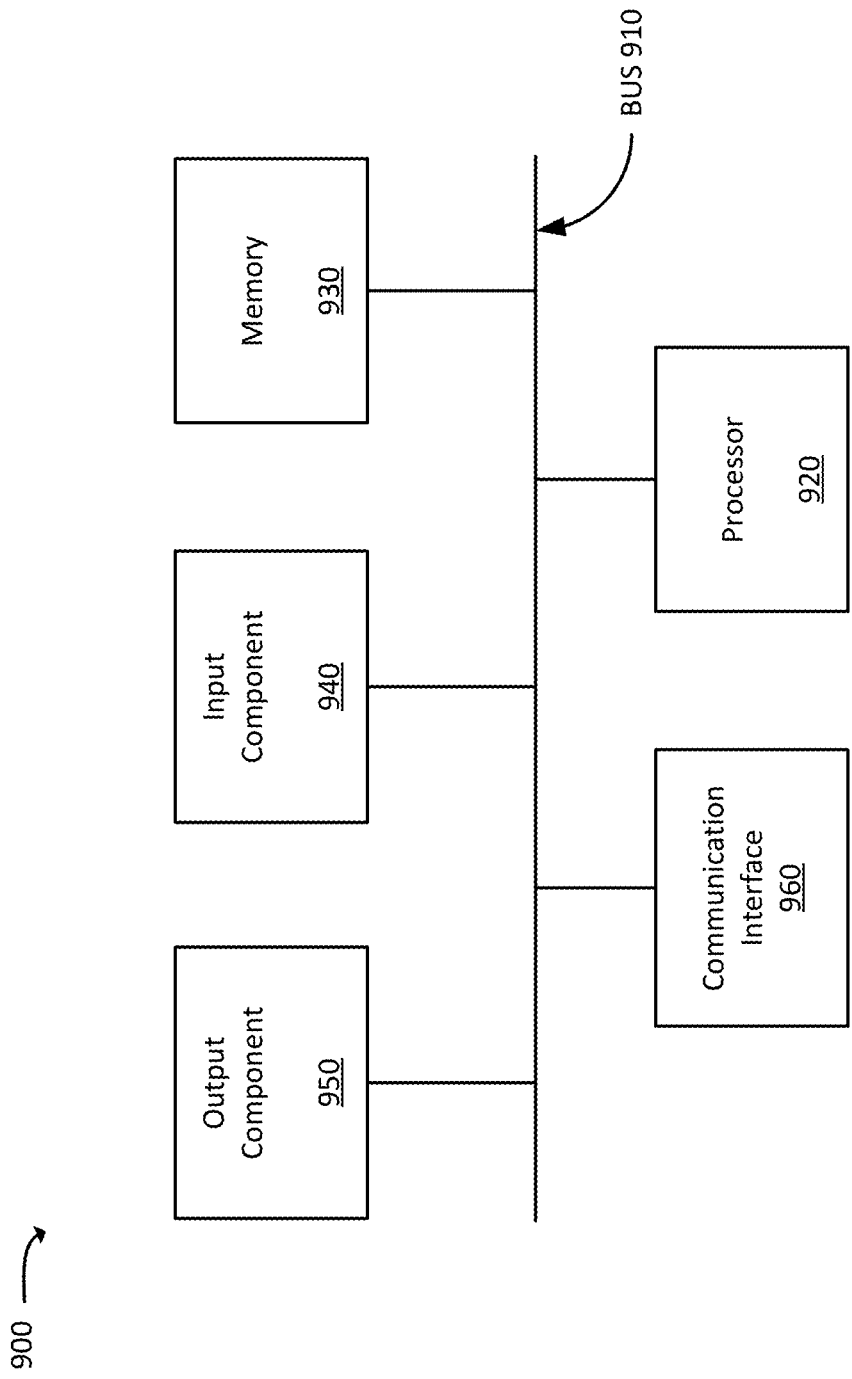

CLOUD SERVICES FOR WEARABLE AND SNAPPABLE DEVICES

RELATED APPLICATIONS

The present application claims the benefit of U.S. Provisional Patent Application No. 61/902,622, titled "CLOUD SERVICES FOR WEARABLE AND SNAPPABLE DEVICES," which was filed on Nov. 11, 2013, and which is hereby incorporated by reference as though fully set forth herein.

BACKGROUND

In an increasingly networked world, more and more traffic, such as data, voice, and video traffic, is transmitted over public and proprietary networks. Wireless networks, in particular, are popular as networks through which subscribers obtain both voice services (e.g., telephone calls) and data services (e.g., email and web surfing). Wireless networks, such as cellular wireless networks, can provide network coverage over large geographic areas (e.g., nationwide coverage). Smartphones may commonly be used to access the wireless networks.

Smartphones, in addition to including a radio interface designed to interact with a wireless network, such as a cellular wireless network, may include other interfaces such as pluggable interfaces (e.g., a universal serial bus (USB) interface) or additional radio interfaces, such as radio interfaces designed to transmit data over short distances (e.g., a Bluetooth® interface). The additional interfaces of a smartphone may be used to connect the smartphone to external devices, such as external input or sensing devices.

One class of external devices may include snappable and wearable devices. A snappable device may include a device that is designed to be directly attached to a smartphone, such as by "snapping" the device into a USB interface of the smartphone. Similarly, a wearable device may be one that is designed to be worn by a user of the smartphone, such as an article of clothing or jewelry, and that may communicate with the smartphone using a short range radio interface (e.g., a Bluetooth® interface). Wearable and snappable devices will be generically referred to herein as "X'able" devices.

X'able devices may include sensors that measure information relating to the user of the smartphone or to an environment associated with the user of the smartphone. The smartphones may provide an application designed to communicate with the x'able device and provide a graphical interface for presenting sensed information and/or controlling the x'able device.

BRIEF DESCRIPTION OF THE DRAWINGS

FIG. 4 is diagram illustrating an example of initial classification training data;

FIG. 9 is a diagram of example components of a device.

DETAILED DESCRIPTION OF PREFERRED EMBODIMENTS

The following detailed description refers to the accompanying drawings. The same reference numbers in different drawings may identify the same or similar elements.

Techniques described herein may relate to the use of x'able devices with a cloud-based classification service. X'able devices may be purchased or otherwise acquired by a user and may sense data associated with an environment of the user. The x'able devices may pair with a mobile communication device (e.g., a smartphone) of the user. The mobile device and the x'able device may together operate to provide an application for sensing environmental data associated with the user, analyzing the environmental data, and providing reports to the user. The analysis of the environmental data may be based on classification of the environmental data (and potentially other data, such as user data) that is performed by a remotely located classification server. The classification server may provide classification services based on classification models that may be generated by the classification server. In some implementations, the reports may include links to initiate live support (e.g., a telephone call or chat session) with a representative to discuss the reports.

Figure 1:
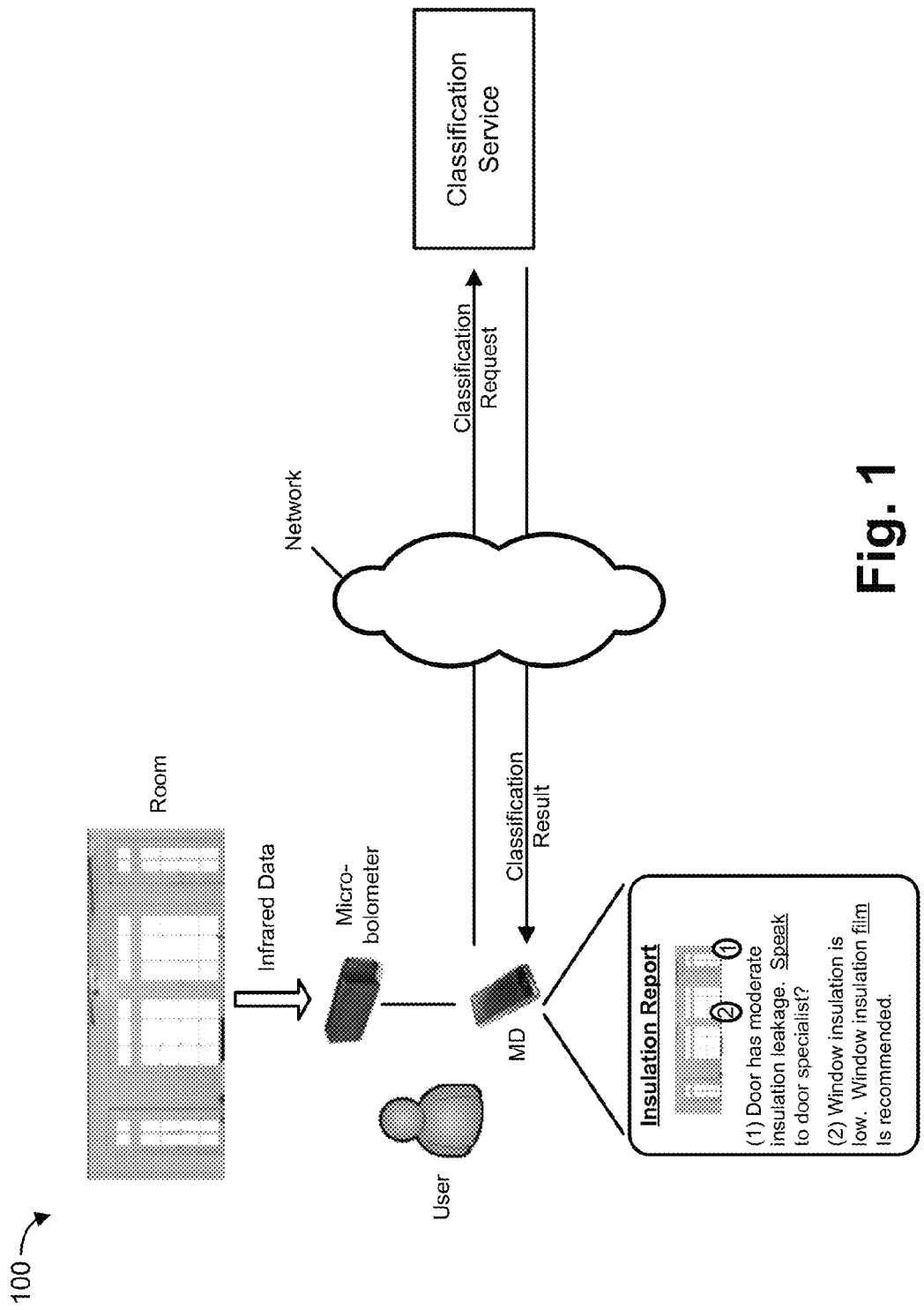
FIG. 1 is a diagram conceptually illustrating an example of an overview of concepts described herein.

FIG. 1 is a diagram conceptually illustrating an example of an overview of concepts described herein. As illustrated in FIG. 1, a user may be associated with a mobile device ("MD") (e.g., a smartphone) and an x'able device. In this example, assume that the x'able device includes a micro-bolometer, which may be a device designed to sense infrared radiation that may correspond to a heat map of a scanned location. For example, a user may scan a room with a micro-bolometer to obtain a representation of the temperature of objects in the room. The user may scan the room in conjunction with an application, executed by the mobile device, that is designed to allow a user to perform a self-guided insulation check of a building (e.g., the user's residence). The application may thus be used by the user to assess the quality of insulation that is provided by windows, doors, and/or other elements in the user's residence.

The heat map data collected by the micro-bolometer may be used to generate a classification request that is transmitted, by the mobile device and over a network, to a classification service. The classification request may include, in addition to the heat map data, other data, such as: additional environmental data (e.g., an indoor and outdoor temperature), data relating to an age or make/model of the windows and doors in the room, or other data may be helpful in providing a classification result relating to the quality of the insulation provided by the windows and/or doors in the room. The classification service may receive the classification request and apply one or more classification models to determine a classification result corresponding to the heat map data (and/or the other data). The classification result may indicate, for example, an insulation level of a particular door or window, whether a particular door or window needs to be repaired or has leaks, etc.

The classification result may be used by an application, associated with the mobile device, that provides the user with a report relating to data sensed by the x'able device. For example, as illustrated, a report ("insulation report") may be provided via a graphical display of the mobile device. In this example, the report includes an image of the scanned room (e.g., an image taken with a camera of the mobile device) in which windows and/or doors in the room may have been automatically identified and an associated with a thermal insulation level. As illustrated, a door in the room (labeled in the report as "1") may be determined to have moderate insulation leakage. The report may provide the user with an option to speak to a door specialist. The option may be indicated via a link (indicated by the word "speak" being underlined), that when selected, may place a call to a representative that may assist the user in purchasing a new door and/or scheduling a visit by a qualified repairperson. In some implementations, selection of the link may provide the user with an option to speak with the representative or initiate a textual chat with the representative. As is further illustrated in FIG. 1, the report may also provide information relating to a window in the room (labeled in the report as "2"). The window may have been automatically identified and determined to have low level of insulation (i.e., the window is poorly insulated). In this example, a recommendation is provided to install window insulation film. A link (indicated by the word "film" being underlined) to purchase window insulation film and/or provide additional information relating to the installation of the window installation film may be provided to the user.

Figure 2:
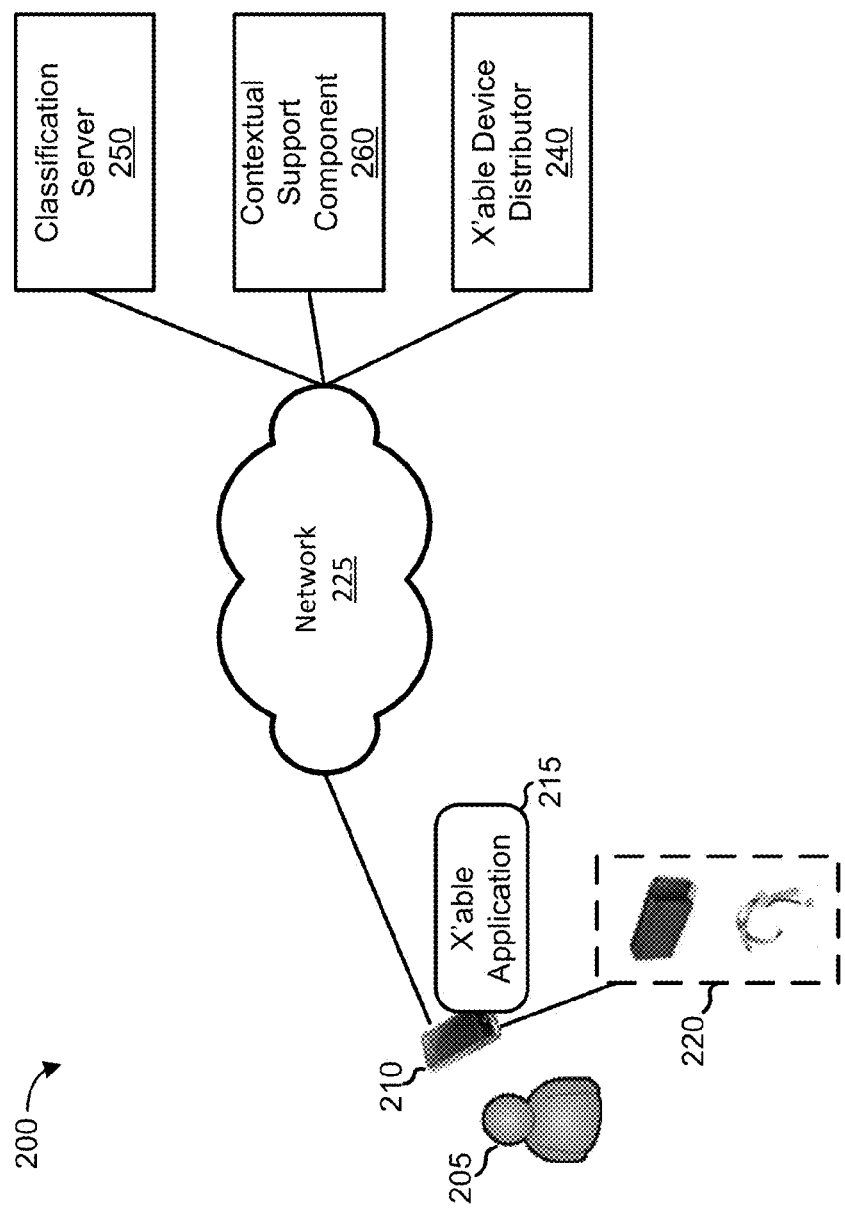
FIG. 2 illustrates an example environment in which systems and/or methods described herein may be implemented.

FIG. 2 illustrates an example environment 200 in which systems and/or methods described herein may be implemented. As shown in FIG. 2, environment 200 may include a user 205 associated with a mobile device 210 (e.g., a smartphone) and one or more x'able devices 220. X'able application 215 may execute on mobile device 110 and provide a software application that uses x'able device 220. Network connectivity may be provided to mobile device 210 via network 225. Mobile device 210 may connect to x'able devices 220 using wireless and/or wired connections (e.g., through a short range wireless connection or using a pluggable, cable connection). As is further shown in FIG. 2, environment 200 may further include x'able device distributor 240, classification server 250, and contextual support component 260.

Mobile device 210 may include a portable/mobile communication device that is capable of connecting to network 225. Mobile device 210 may include a smartphone, a personal digital assistant ("PDA"), a laptop computer, a desktop computer, a tablet computer; or another type of computation and communication device. Mobile device 210 may include a radio interface designed to connect to network 225. The radio interface may include a cellular wireless interface. Mobile device 210 may also include additional interfaces to connect to additional devices, such as x'able devices 220. The additional interfaces may include a short range radio interface (e.g., Bluetooth®), a WiFi interface, and/or a wired interface (e.g., a USB interface).

X'able application 215 may be designed to function with one or more of x'able devices 220. X'able application 215 may be a user-installed or third-party installed application, such as an application that is installed at mobile device 210 when a user 205 initially connects mobile device 210 to an x'able device 220. X'able application 215 may generally be used to control x'able device 220 and/or provide an interface in which data collected by x'able devices 220 may be provided to user 205. X'able application 215 may also act as a communication link between x'able devices 220 and services provided through network 225. In some implementations, each x'able application, developed by an x'able device distributor 240, may be independently developed by the x'able device distributor 240, potentially using an application programming interface (API) that is provided by an operator of classification server 250 and/or contextual support component 260. Alternatively or additionally, an operator of classification server 250 and/or contextual support component 260 may provide a template x'able application that may be customized by an x'able device distributor 240. X'able application 215 will be described in more detail below.

X'able devices 220 may include snappable and/or wearable devices that each include one or more sensors to sense environmental data. Data sensed by x'able devices 220 may be transmitted to mobile device 210. Non-limiting examples of x'able devices 220 include: a micro-bolometer device (infrared image and heat capture), a microscopy device (object image capture), a multi-sensing gas device (carbon monoxide, methane, propane, natural gas, etc.), a humidity sensor device, a pressure sensing device, a three-dimensional vision device (3D image capture), a brain wearable device (electrocardiogram), a body monitor device (blood pressure, heart rate, etc.), or combinations thereof.

Network 225 may include one or more networks that provide wireless network connectivity to mobile device 210. For example, network 225 may represent a wireless network that provides cellular wireless coverage. In some implementations, network 225 may be associated with an evolved packet system ("EPS") that includes a Long Term Evolution ("LTE") network and/or an evolved packet core ("EPC") network that operate based on a Third Generation Partnership Project ("3GPP") wireless communication standard. A radio access network ("RAN") associated with wireless network 225 may include one or more base stations, some or all of which may take the form of an evolved node B ("eNB").

X'able device distributor 240 may represent the manufacturer of an x'able device 220, a distributor of an x'able device 220, or another entity that markets, develops, and/or sells x'able devices 220, or software/services related to x'able devices 220, to end-users (e.g., user 205). X'able device distributor 240 may develop or publish an x'able application 215 for use with a particular one or more x'able devices 220. X'able application 215 may use classification services provided by classification server 250. For example, x'able device distributor 240 may upload initial training data, corresponding to data sensed by x'able devices 220, to application server 250. Classification server 250 may perform machine classification operations, such as machine classification based on unsupervised learning techniques, to classify the sensed data as belonging to one or more categories.

Classification server 250 may include one or more computing devices that provide classification services to x'able applications 215. Although referred to as a "server," classification server 250 may include may include a single computing device, clusters of computing devices (e.g., blades or rack-mounted server computers) that are co-located or geographically distributed, cloud-based (e.g., computing as a service) computing solutions, or other arrangements of computing devices.

Classification server 250 may receive classification training data, such as classification training data uploaded by x'able device distributor 240. Classification server 250 may implement machine learning techniques to generate classification models that are trained based on the classification training data. The classification models may be used to output classification categories (classification results) that are transmitted to x'able application 215. Classification queries may be based on data sensed by x'able devices 220. In one implementation, classification server 250 may implement unsupervised classification techniques. In some implementations, x'able device distributor 240 may define a transform flow describing how data received from a particular x'able application 215 is to be processed or pre-processed before being used as an input to a classification model. Classification models, generated by classification server 250, may be updated as additional classification data is received from users during the operation of x'able application 215.

Contextual support component 260 may represent a grouping of human operators to provide live human assistance or guidance to users of x'able application 215. For example, contextual support component 260 may represent a call center or texting center in which one or more human operators work. As another example, contextual support component 260 may include one or more computing devices to receive requests for textual support, from x'able application 215, and to transfer the support session to an operator associated with x'able device distributor 240. X'able application 215 may request contextual support, from contextual support component 260, based on x'able application 215 entering a particular state (such as a state triggered by a classification query to classification server 250). In this situation, x'able application 215 may present user 205 with a dialog giving the user an option to chat, either via a textual or voice interface, with an operator.

Figure 3:
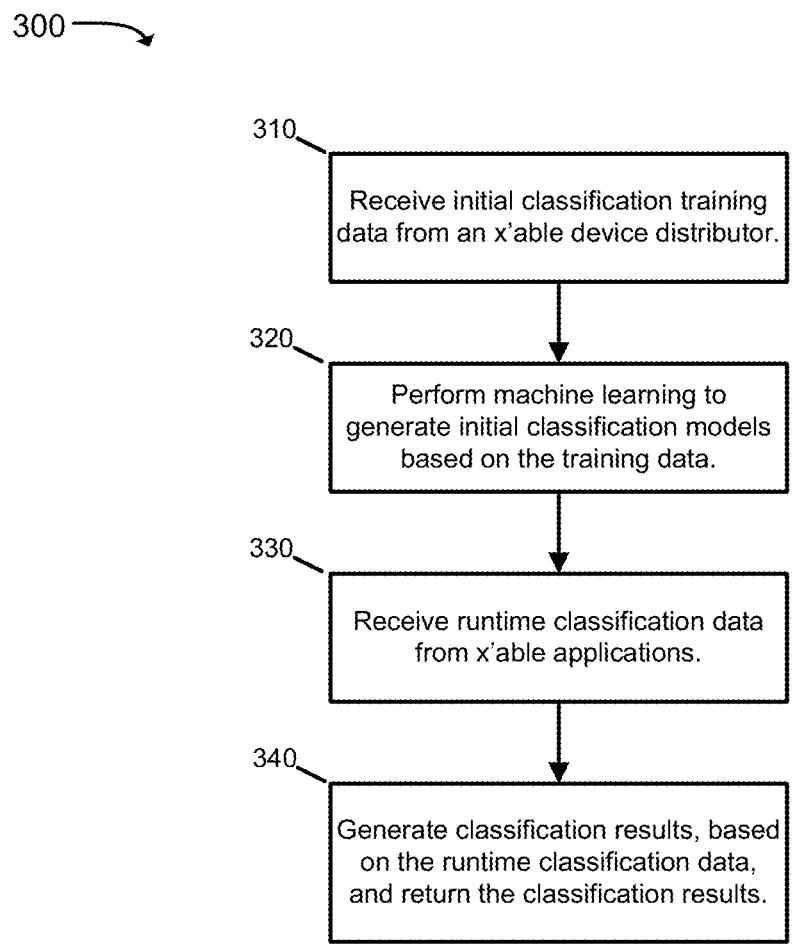
FIG. 3 is a flow chart illustrating an example process relating to the operation of a classification server in providing classification services to x'able applications.

FIG. 3 is a flow chart illustrating an example process 300 relating to the operation of classification server 250 in providing classification services to x'able applications 215.

Process 300 may include receiving initial classification training data from the x'able device distributor (block 310). The initial classification data may include a number of labeled classification records, where each classification record may include a number of values (e.g., data sensed by x'able devices 220, user-specific information, or other information). The initial classification training data may be generated by x'able device distributor 240 as data that x'able device distributor 240 believes will be similar to actual classification data that is generated by x'able application 215.

FIG. 4 is diagram illustrating an example of initial classification training data received in block 310 (FIG. 4). As illustrated, the initial classification training data may include a number of classification records 410. Each classification record 410 may include a label 420 to identify the record as corresponding to a particular type and one or more feature values 430 (illustrated as feature_1, feature_2, . . . , feature_N). In the example illustrated, records 410 may be records generated based on data received from a micro-bolometer (infrared image and heat sensing device) snappable device. The records may each correspond to data generated in response to a user focusing the micro-bolometer on a particular structure of the residence. For example, the first record 410 may correspond to measurements made by sensing heat values around a window and the second record 410 may correspond to measurements made by sensing heat values around a door.

In some implementations, each record of the initial classification training data may additionally be associated with a classification result value. For example, the classification record labeled "window" may include an indication of whether the measurements, relating to a window, indicate that the window is well insulated, moderately insulated, or poorly insulated.

Referring back to FIG. 3, process 300 may further include performing machine learning techniques to generate initial classification models based on the received initial classification training data (block 320). In an implementation corresponding to the example training data of FIG. 4, a separate classification model may be generated for each differently labeled record. As previously mentioned, the classification models may be generated using a number of potential supervised or unsupervised model generation techniques. In some implementations, classification server 250 may use different types of classification models (e.g., linear support vector classification, neural net based classification, etc.)

Process 300 may further include receiving runtime classification data from x'able applications (block 330). The runtime classification data may be data corresponding to sensed data, from x'able devices 220, and potentially after processing and/or augmenting by the corresponding x'able application 215. For example, x'able application 215 may receive data from a number of x'able devices and aggregate the data to form a classification record. The classification record may be transmitted to classification server 250 as a classification query.

Process 300 may further include generating classification results, based on the runtime classification data (block 340). The generated classification results (e.g., a classification class) may be returned to the x'able application that transmitted the runtime classification data. In some implementations, classification server 250, based on the received runtime classification data, may occasionally or periodically update the classification models. In this manner, the classification models, maintained by classification server 250, may be updated to take advantage of new user data.

Figure 5:
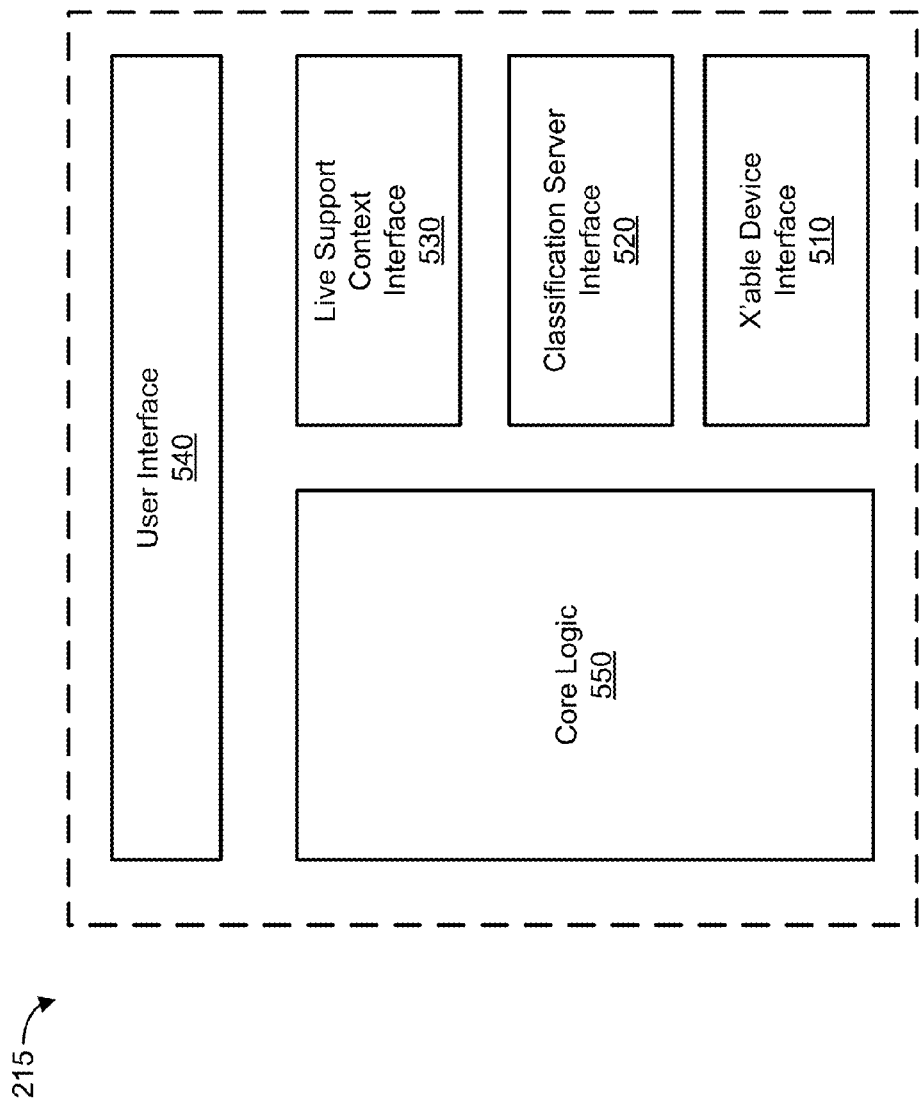
FIG. 5 is a block diagram conceptually illustrating components of an x'able application.

FIG. 5 is a block diagram conceptually illustrating example components of x'able application 215. As illustrated, x'able application 215 may include x'able device interface 510, classification server interface 520, live support context interface 530, user interface 540, and core logic 550.

X'able device interface 510 may include logic to provide an interface to x'able devices 220. X'able device interface 510 may, for example, be configured based on the specific x'able devices 220 for which x'able application 215 is compatible. X'able device interface 510 may generally handle communications with x'able devices 220.

Classification server interface 520 may handle communications with classification server 250. Classification server interface 520 may, for example, handle transmitting classification queries to classification server 250 and receiving responses to the queries.

Live support context interface 530 may handle communications with contextual support component 260. In one implementation, live support sessions (e.g. voice or text chat) may be implemented using voice over LTE (VoLTE) services in network 225. Live support context interface 530 may establish and teardown the live support sessions.

User interface 540 may operate to handle the presentation of a graphical interface to user 205. User interface 540 may provide, for example, instructions to the user on the operation of a particular x'able device 220, the ability to control functionality of x'able device 220 (e.g., for a micro-bolometer, control when the micro-bolometer is actively sensing), and provide feedback and/or display the data sensed by x'able device 220.

Core logic 550 may include functionality relating to the overall control and operation of x'able application 215. Core logic 550 may control the interaction of x'able device interface 510, classification server interface 520, live support context interface 530, and user interface 540.

Figure 6:
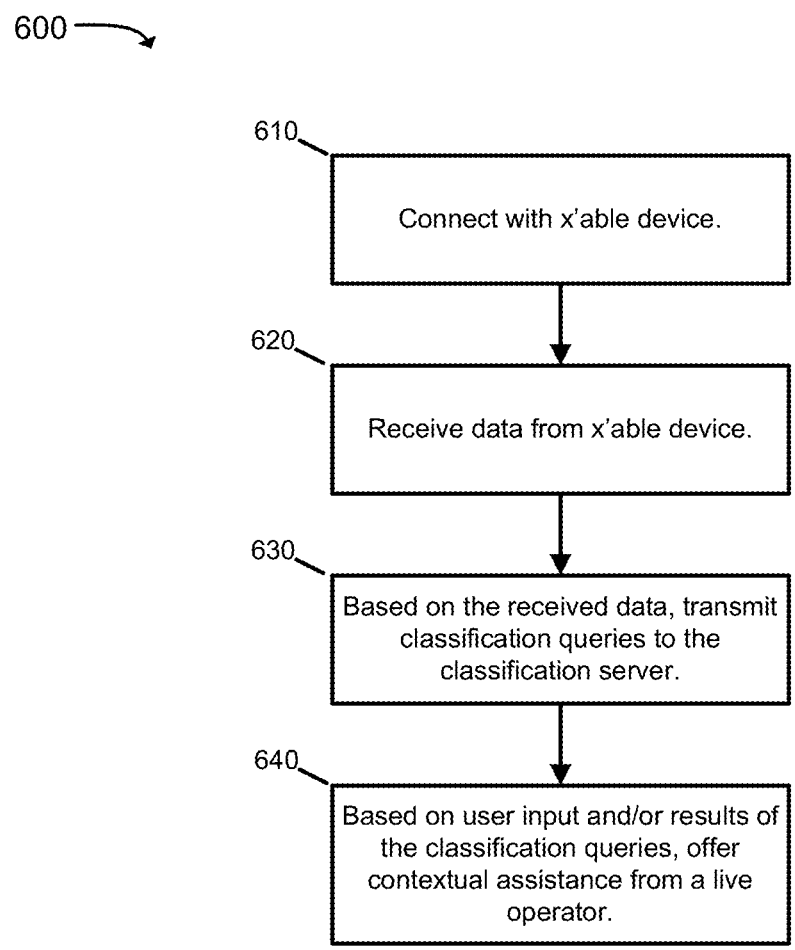
FIG. 6 is a flow chart illustrating an example process relating to the operation of an x'able application.

FIG. 6 is a flow chart illustrating an example process 600 relating to the operation of an x'able application. Process 600 may be implemented by, for example, mobile device 210.

Process 600 may include connecting with an x'able device (block 610). In some implementations, as part of the initial connection to an x'able device, x'able application 215 may identify the x'able device and, based on the identification of the x'able device, may download or update x'able application 215 to include functionality corresponding to the identified x'able device (e.g., functionality implemented by the corresponding x'able device distributor 240). As previously mentioned, the connection to the x'able device may be performed via a short range radio interface (e.g., Bluetooth®) or a physical cable connection (e.g., USB).

Process 600 may further include receiving data from the x'able device (block 620). The data may include data sensed by x'able device 215. In one implementation, x'able application 215 may instruct the user on how to control x'able device 215 to obtain useful sensed data. For instance, an example of a home monitoring and/or inspection application, in which x'able device 215 includes a snappable micro-bolometer, x'able application 215 may instruct the user to point the sensor of x'able device 220 at various structures in the user's home, such as a window, a door, etc. The user may indicate at which structure x'able device 220 is pointed and may then initiate recording of the sensed data. In conjunction with the data sensed by x'able device 220, x'able application 215 may control mobile device 210 to simultaneously acquire additional data. For example, a camera of the mobile device may be used to take a picture of the window that is being examined by the micro-bolometer. Both the picture (taken by mobile device 210) and an infrared image (taken by x'able device 220) may be used as part of subsequent analysis and/or classification that may be implemented as part of the operation of the home monitoring/inspection application.

Process 600 may further include, based on the data received from the x'able device, transmitting classification queries to the classification server (block 630). Classification server 250, as previously mentioned, may provide classification services relating to the operation of x'able devices 220. The classification queries may include requests to determine classification categories relating to the operation of x'able application 215. For example, in the context of a home monitoring/inspection application, the classification queries may quantify the amount a particular structure, in the user's home, is insulated (e.g., a door may be determined to be "well insulated," "moderately insulated," "poorly insulated"). Based on results of the classification queries, x'able application 215 may provide a report and/or make recommendations to user 205.

Process 600 may further include offering contextual assistance from a live operator (block 640). The contextual assistance may be based on user input and/or results of the classification queries (block 640). For example, in the context of the home monitoring/inspection application, based on a classification query that indicates that a window in the user's home is "poorly insulated," x'able application 215 may provide a dialogue to the user asking whether the user would like to speak to a live operator that is an expert in window repair and replacement. If the user chooses to speak to the live operator, x'able application 215 may enable, such as via VoLTE services, a voice call with the live operator and may potentially supplement the voice call with the data obtained by x'able application 215 (e.g., an infrared image of the window and pictures of the window).

Figure 7:
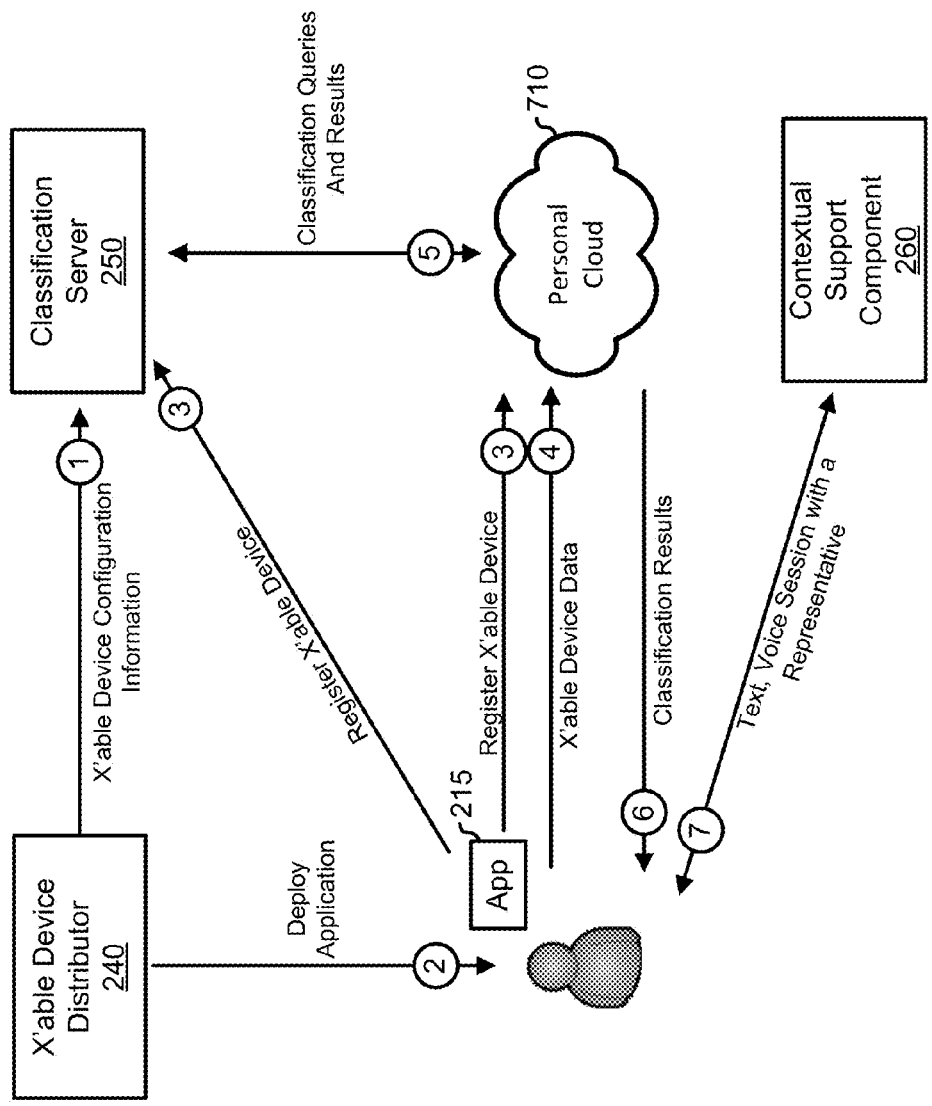
FIG. 7 is a diagram illustrating an example of communication flows for registering and using an x'able device.

FIG. 7 is a diagram illustrating an example of communication flows for registering and using an x'able device 220. In FIG. 7, user 205 may represent a user that is associated with a mobile device 210 and one or more x'able devices 220. Personal cloud 710 is also illustrated in FIG. 7. Personal cloud 710 may represent network-based storage and/or application services that are provided by, for example, a network provider associated with network 225, x'able device distributor 240, a provider that implements classification server 250, or another entity. Personal cloud 740 may generally represent remote (cloud-based) storage for user data, such as data relating to the operation of x'able application 215.

In the context of FIG. 7, assume that x'able device distributor 240 develops x'able application 215, such as an application designed to execute on mobile device 210 in conjunction with a snappable x'able device 220 (e.g., a micro-bolometer device, a multi-sensing gas device a humidity sensor device, etc.). X'able device distributor 240 may develop the application using services provided by classification server 250. For example, classification server 250 may provide an x'able device partner interface (XDPI), such as a web interface and/or an application programming interface (API), through which x'able device distributor 240 may configure classification services for a particular x'able device 220. In one implementation, configuring the classification services for x'able device 220 may include specifying transformations, such as affine transformations, that may be applied to data sensed by x'able device 220. For example, x'able device distributor 240 may specify that data received from x'able device 220 is shifted by particular amount and/or scaled by a particular amount. For example, the average for an input set of data may be subtracted from the mean of all the values in the input set (i.e., shifted to obtain a zero mean vector) and divided (e.g., scaled) by the variance of the values of the input set. In some implementations, and as previously mentioned, x'able device distributor 240 may also upload initial training data, such as data corresponding to data sensed by x'able devices 220. Classification server 250 may perform machine classification operations, such as machine classification based on unsupervised learning techniques, to classify the sensed data as belonging to one or more categories.

In some implementations, in addition to specifying transformations, configuring the classification services for x'able device 220 may include specifying other parameters relating to x'able device 220. For example, x'able device distributor 240 may specify how bandwidth used for x'able device 220 is to be billed (e.g., by specifying a billing plan, specify whether users 205 to directly billed, etc.) and/or specifying how classification results are to be treated (e.g., by specifying a format for the classification results and/or a destination to which the classification results are to be transmitted).

As illustrated in FIG. 7, x'able device distributor 240 may transmit the x'able device configuration information (arrow "1") to classification server 250. As mentioned above, the configuration information may include transformation information, or other information, relating to the initial setup of classification services for x'able device 220. In this manner, as part of development of x'able application 215, for a particular x'able device, x'able device distributor 240 may initially configure classification server 250 to operate with the x'able device 220.

At some point, user 205 may wish to use an x'able device 220 in conjunction with mobile device 210 (e.g., as a snappable device). As part of the initial registration or pairing of x'able device 220 with mobile device 210, an x'able application 215 associated with x'able device 220, may be deployed (e.g., installed) at mobile device 210 (arrow "2"). Although the installation of the application is illustrated, in FIG. 7, as being received from x'able device distributor 240, in some implementations, x'able application 215 may be transmitted to the mobile device 210 from another location or server, such as from an application installation platform corresponding to the operating system that is used by mobile device 210. Deployment of x'able application 215 may include pairing (e.g., over a short range wireless connection and/or wired connection) of the application with x'able device 220.

In some implementations, user 205 may register x'able device 220 with personal cloud 740 and/or classification server 250 (arrow "3"). Registering x'able device 220 with personal cloud 740 may, for instance, initialize storage space, at personal cloud 740, for data sensed by x'able device 220. Registering x'able device 220 with classification server 250 may include identifying x'able device 220 and/or user 205 as a device/user that will use classification server 250 in the future.

In some implementations, instead of or in addition to mobile device 210 directly registering x'able device 220 and personal cloud 740, classification server 250, in response to registration of x'able device 220, may register x'able device 220 with personal cloud 740. Registering x'able device 220 may, for example, trigger the provisioning of storage space at personal cloud 740. In one implementation, data sensed by x'able device 220 may be transmitted to personal cloud 740 for storage. Storing the sensed data may trigger the classification services provided by classification server 250.

During operation of x'able device 220 by user 205, x'able application 215 may obtain, from x'able device 220, data (e.g., data sensed by the x'able device 220) and transmit the data to personal cloud 740 (arrow "4"). For example, in the context of x'able device 220 being a micro-bolometer, data quantifying the amount of sensed infrared light, along with other data (e.g., meta-data describing conditions relating to the operation of x'able device 220, such as a location of x'able device 220, an image taken by mobile device 210 during operation of x'able device 220, and/or data identifying user 205), may be transmitted to personal cloud 740.

The reception of the data, in personal cloud 740, may cause classification queries, relating to the sensed data, to be issued to classification server 250 (arrow "5"). Results corresponding to the classification queries may be received, by personal cloud 740, and transmitted to mobile device 210 (arrow "6"). In some implementations, classification requests may be transmitted directly from mobile device 210 to classification server 250. Additionally, in some implementations, classification results may be transmitted directly from personal cloud 740 to contextual support component 260.

In some implementations, the classification results may be used by x'able application 215 to provide a report to user 205. The report may include classification results and/or information relating to the interpretation of the classification results. For example, as previously mentioned, in the context of an application designed to apprise users of the quality of insulation at a user residence, the report may include an indication of insulation associated with the doors and windows of the user's residence. For some x'able applications 215, x'able device distributors 240 may have enabled contextual support to connect user 205 with a live operator. In this situation, based on the report, x'able application 215 may provide user 205 an option to initiate a text or voice session with a support representative (arrow "7"). The text/voice session may be implemented as, for example, a VoLTE-based communication session.

In the discussion of FIG. 7, personal cloud 740 was described as storing data. In other possible implementations, data may be stored locally at mobile device 210 and classification queries may be directly transmitted to classification server 250.

In some implementations, as previously mentioned, classification server 250 may perform classification based on unsupervised machine learning. Unsupervised machine learning may generally refer to machine learning in which one or types of classification models are automatically determined and/or automatically trained.

Figure 8:
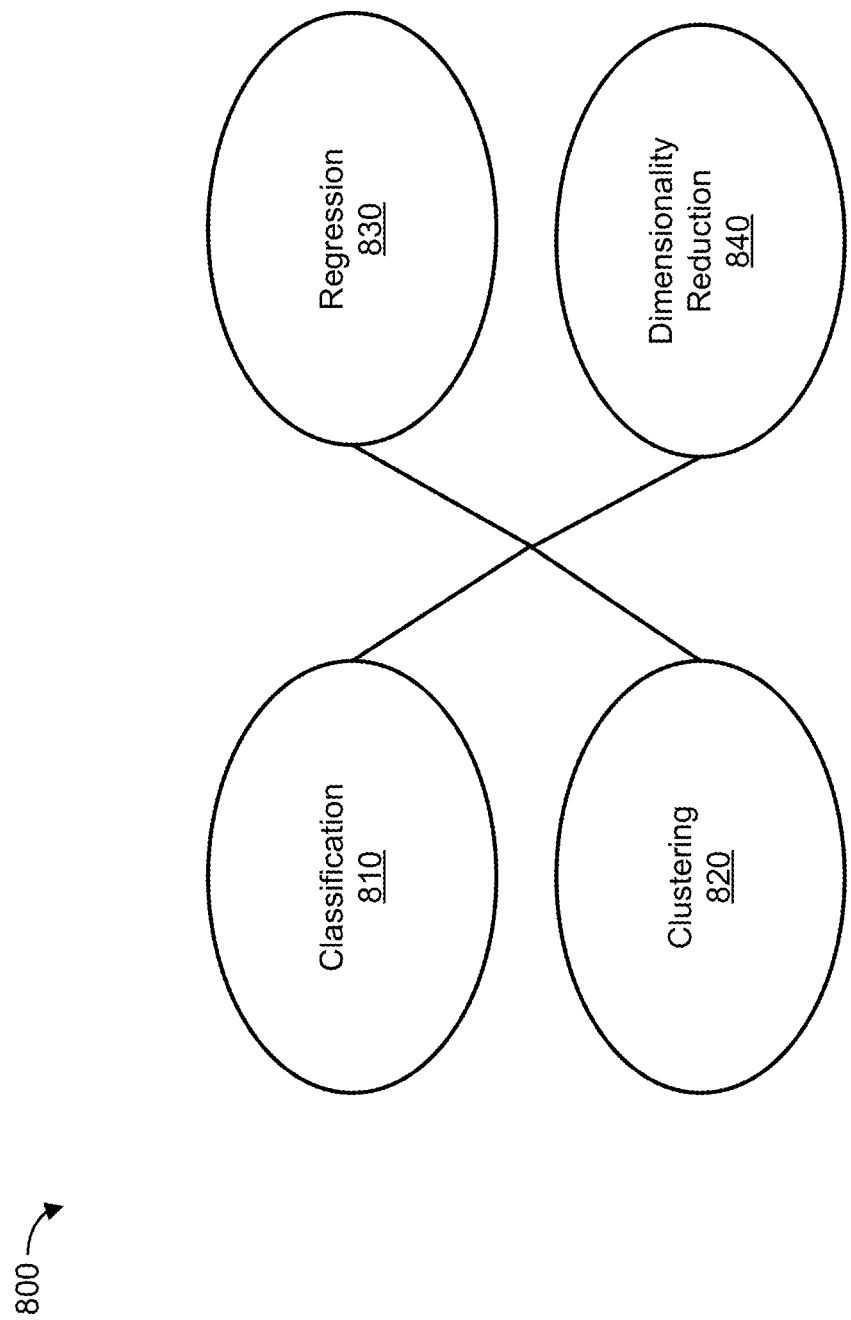
FIG. 8 is a diagram illustrating an example of conceptual components relating to unsupervised machine learning.

FIG. 8 is a diagram illustrating an example of conceptual components 800 relating to unsupervised machine learning. In one implementation, components 800 may be implemented by classification server 250.

Components 800 may include classification component 810, clustering component 820, regression component 830, and dimensionality reduction component 840. Classification component 810 may represent one or more logical operations that relate to classification of input sets of data. The operation of classification component 810 may be based on classification models including, for example, linear support vector machines (SVMs) or support vector classifiers (SVCs), k-nearest neighbor techniques, naïve Bayes techniques, SVC ensemble classifiers, stochastic gradient descent (SGD) classifiers, kernel approximation, neural network classification, or other techniques. As previously mentioned, the type(s) of classification models to use for a particular data set, that is uploaded by x'able device distributor 240, may be automatically determined by classification component 810. Classification component 810 may generally determine a classification category to which an input set of data belongs. Input data sets may first be processed by one or more of clustering component 820, regression component 830, and dimensionality reduction component 840 in order improve the classification success rate.

Clustering component 820 may operate to perform automatic grouping of similar sets of data. The operation of clustering component 820 may be based on, for example, mean shift variational inference for Gaussian mixture model ("VB-GMM") techniques, mini-batch k-means techniques, spectral clustering Gaussian mixture model ("GMM") techniques, or other techniques.

Regression component 830 may operate to perform automated regression analysis to estimate relationships between variables in a data set. The operation of regression component 830 may be based on, for example, SGD regression, lasso and elastic net regression, support vector regression ("SVR"), or other techniques.

Dimensionality reduction component 840 may operate to reduce the number of variables in an input set. The operation of regression component 830 may be based on, for example, principal component analysis ("PCA"), randomized PCA, kernal approximation, isomap spectral embedding, or other techniques.

In operation, classification server 250 may determine model types and model parameter values based on initial classification training data that is received from x'able device distributor 240. The determination of the model types and model parameter values may be made using functionality corresponding to components 800.

FIG. 9 is a diagram of example components of device 900. One or more of the devices described above (e.g., as described with respect to FIGS. 1, 2, 5, and 7) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, a radio interface, or the like. Communication interface 960 may include a wireless communication device, such as an infrared ("IR") receiver, a Bluetooth radio, a Wi-Fi radio, a cellular radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software. In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 3 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC (application specific integrated circuit) or a FPGA (field programmable gate array), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method implemented by a mobile computing device, the method comprising:
   connecting, by the mobile computing device, to an external sensing device that is snappable to the mobile computing device or wearable by a user of the mobile computing device;
   receiving, by the mobile computing device and from the sensing device, environmental data sensed by the sensing device;
   providing, by the mobile computing device and over a wide area network, a classification query to a remote classification service, the classification query being based on the sensed data;
   receiving, by the mobile computing device and from the classification service, classification results in response to the classification query; and
   providing, by the mobile computing device and via a graphical display of the mobile computing device, a report based on the classification results,
   wherein the sensing device includes a micro-bolometer and the report includes a report describing thermal insulation levels associated with areas of a premise of the user.

2. The method of claim 1, wherein providing the classification query further includes:
   providing meta-data relating to the environmental data sensed by the sensing device, the meta-data including:
      data indicating a location of the mobile computing device during operation of the sensing device in sensing the environmental data,
      data relating to a user of the mobile computing device, or
      one or more images taken by the mobile computing device during operation of the sensing device in sensing the environmental data.

3. The method of claim 1, wherein the mobile computing device is connected to the sensing device via a short range wireless connection or a pluggable cable connection and wherein the mobile computing device is connected to the wide area network via a cellular wireless interface.

4. The method of claim 1, wherein the sensing device additionally includes a microscopy device, a multi-sensing gas device, a humidity sensor device, a pressure sensing device, or a three-dimensional vision capture device.

5. The method of claim 1, further comprising:
   transmitting, over the wide area network, the environmental data sensed by the sensing device to a cloud-based storage service.

6. The method of claim 1, wherein the report, including the thermal insulation levels, additional includes an indication of thermal leakage levels associated with doors or windows.

7. A method implemented by a mobile computing device, the method comprising:
   connecting, by the mobile computing device, to an external sensing device that is snappable to the mobile computing device or wearable by a user of the mobile computing device;

receiving, by the mobile computing device and from the sensing device, environmental data sensed by the sensing device;

providing, by the mobile computing device and over a wide area network, a classification query to a remote classification service, the classification query being based on the sensed data;

receiving, by the mobile computing device and from the classification service, classification results in response to the classification query; and providing, by the mobile computing mobile computing device, a report based on the classification results, wherein the report includes one or more links to initiate voice or text sessions with live representatives.

8. The method of claim 7, wherein the voice or text sessions are implemented using Voice over Long Term Evolution (VoLTE) services.

9. A mobile communication device comprising:
a non-transitory memory device storing a set of processor-executable instructions; and
a processor configured to execute the processor-executable instructions, wherein executing the processor-executable instructions causes the processor to:
connect to an external sensing device that is snappable to the mobile computing device or wearable by a user of the mobile computing device;
receive, from the sensing device, environmental data sensed by the sensing device;
provide, over a wide area network, a classification query to a remote classification service, the classification query being based on the sensed data;
receive, from the classification service, classification results in response to the classification query; and
provide, via a graphical display of the mobile computing device, a report based on the classification results,
wherein the sensing device includes a micro-bolometer and the report includes a report describing thermal insulation levels associated with areas of a premise of the user.

10. The mobile communication device of claim 9, wherein executing the processor-executable instructions further causes the processor to:
provide meta-data relating to the environmental data sensed by the sensing device, the meta-data including:
data indicating a location of the mobile computing device during operation of the sensing device in sensing the environmental data,
data relating to a user of the mobile computing device, or
one or more images taken by the mobile computing device during operation of the sensing device in sensing the environmental data.

11. The mobile communication device of claim 9, wherein the mobile computing device is connected to the sensing device via a short range wireless connection or a pluggable cable connection and wherein the mobile computing device is connected to the wide area network via a cellular wireless interface.

12. The mobile communication device of claim 9, wherein the sensing device additionally includes a microscopy device, a multi-sensing gas device, a humidity sensor device, a pressure sensing device, or a three-dimensional vision capture device.

13. The mobile device of claim 9, wherein the report, including the thermal insulation levels, additional includes an indication of thermal leakage levels associated with doors or windows.

14. A mobile communication device comprising:
a non-transitory memory device storing a set of processor-executable instructions; and
a processor configured to execute the processor-executable instructions, wherein executing the processor-executable instructions causes the processor to:
connect to an external sensing device that is snappable to the mobile computing device or wearable by a user of the mobile computing device;
receive, from the sensing device, environmental data sensed by the sensing device;
provide, over a wide area network, a classification query to a remote classification service, the classification query being based on the sensed data;
receive, from the classification service, classification results in response to the classification query; and
provide, via a graphical display of the mobile computing device, a report based on the classification results,
wherein the report includes one or more links to initiate voice or text sessions with live representatives.

15. The mobile communication device of claim 14, wherein the voice or text sessions are implemented using Voice over Long Term Evolution (VoLTE) services.

16. A non-transitory computer readable medium containing program instructions for causing one or more processors, associated with a mobile computing device, to:
connect to an external sensing device that is snappable to the mobile computing device or wearable by a user of the mobile computing device;
receive, from the sensing device, environmental data sensed by the sensing device;
provide, over a wide area network, a classification query to a remote classification service, the classification query being based on the sensed data;
receive, from the classification service, classification results in response to the classification query; and
provide, via a graphical display of the mobile computing device, a report based on the classification results,
wherein the report includes one or more links to initiate voice or text sessions with live representatives.

17. The non-transitory computer readable medium of claim 16, wherein the program instructions for causing the one or more processors to provide the classification query further includes program instructions for causing the one or more processors to:
provide meta-data relating to the environmental data sensed by the sensing device, the meta-data including:
data indicating a location of the mobile computing device during operation of the sensing device in sensing the environmental data,
data relating to a user of the mobile computing device, or
one or more images taken by the mobile computing device during operation of the sensing device in sensing the environmental data.

18. The non-transitory computer readable medium of claim 16, wherein the mobile computing device is connected to the sensing device via a short range wireless connection or a pluggable cable connection and wherein the mobile computing device is connected to the wide area network via a cellular wireless interface.

19. A non-transitory computer readable medium containing program instructions for causing one or more processors, associated with a mobile computing device, to:
connect to an external sensing device that is snappable to the mobile computing device or wearable by a user of the mobile computing device;

receive, from the sensing device, environmental data sensed by the sensing device;
provide, over a wide area network, a classification query to a remote classification service, the classification query being based on the sensed data;
receive, from the classification service, classification results in response to the classification query; and
provide, via a graphical display of the mobile computing device, a report based on the classification results,
wherein the sensing device includes a micro-bolometer and the report includes a report describing thermal insulation levels associated with areas of a premise of the user.

20. The non-transitory computer readable medium of claim 19, wherein the report, including the thermal insulation levels, additional includes an indication of thermal leakage levels associated with doors or windows.

* * * * *